United States Patent
Lee

(10) Patent No.: US 6,641,364 B1
(45) Date of Patent: Nov. 4, 2003

(54) APPARATUS FOR MINIMIZING NOISE IN A FAN UNIT

(75) Inventor: Zong Tang Lee, Singapore (SG)

(73) Assignee: Kyodo-Allied Industries Ltd., Singapore (SG)

( * ) Notice: Subject to any disclaimer, the term of this patent is extended or adjusted under 35 U.S.C. 154(b) by 0 days.

(21) Appl. No.: 10/070,455

(22) PCT Filed: Sep. 30, 1999

(86) PCT No.: PCT/SG99/00097

§ 371 (c)(1),
(2), (4) Date: Mar. 6, 2002

(87) PCT Pub. No.: WO01/23764

PCT Pub. Date: Apr. 5, 2001

(51) Int. Cl.⁷ ............................................. F04D 29/66
(52) U.S. Cl. ................. 415/208.3; 415/119; 415/211.2; 98/42.02
(58) Field of Search ............................ 415/208.3, 119, 415/211.2, 206; 98/42.02

(56) References Cited

U.S. PATENT DOCUMENTS 4,162,410 A * 7/1979 Amick ........................ 290/55

| | | |
|---|---|---|
| 4,768,424 A | 9/1988 | Frenkler |
| 6,038,186 A | 3/2000 | Tanizaki |
| 2002/0119747 A1 | 8/2002 | Tang |

FOREIGN PATENT DOCUMENTS

WO    WO 99/11984 A1    3/1999

\* cited by examiner

Primary Examiner—Edward K. Look
Assistant Examiner—J. M. McAleenan
(74) Attorney, Agent, or Firm—Charles Berman; Claude Nassif; Greenberg Traurig, LLP

(57) ABSTRACT

The present invention is a system of symmetric guides (25A, 25B) and baffles (26, 28) for directing and diffusing the external air drawn from a fan blower (12) before distributing the flow evenly to the outlet of a fan filter unit (32). This arrangement not only reduces the turbulence and minimizes pressure loss within a fan filter unit (32) but also maintains the even distribution of air when discharged through the same system. Furthermore, the present invention is implemented in dimensions substantially similar to that of the fan blower (12) in terms of heights. As such, the present invention minimizes noise of a fan filter unit (32) even in low clean room ceiling height. Finally, the present invention's guides (25A, 25B) and baffles (26, 28) are symmetrical surrounding the fan blower (12), which allows either the clockwise fan or the anti-clockwise fan to be used for the same fan filter unit (32) for user's convenience.

23 Claims, 3 Drawing Sheets

← DIRECTION OF FAN ROTATION →

| Power Supply (3 Ph 380v) | 50 Hz | | 50 Hz | | 50 Hz | |
|---|---|---|---|---|---|---|
| Ext. Static Pressure (mmAq) | 5.0 | | 7.5 | | 10 | |
|  | * I | ** II | * I | ** II | * I | ** II |
| Ave. Air Velocity (m/s) | 0.46 | 0.44 | 0.44 | 0.40 | 0.38 | 0.36 |
| Noise Level dBA (1.0m below filter face) | 53.4 | 58.7 | 53.2 | 58.5 | 53.8 | 58.4 |

Notes: * I: FFU WITH AIR GUIDE AND BAFFLE
** II: FFU WITHOUT AIR GUIDE AND BAFFLE

APPARATUS FOR MINIMIZING NOISE IN A FAN UNIT

The present invention relates to an apparatus for minimising noise from air moving devices, such as fans, air blowers etc. In particular, the present invention relates to a fan unit which may be used with a filter.

It is common to control the number of particles in the air in a modern production and/or testing facility in order to ensure the quality of its output. Whether be it for wafer dies, compact discs or memory disk drives, effective fan filter units are needed to not only keep the particles contents within the clean room at acceptable levels but also to circulate the air to maintain a pleasant working environment for the clean room workers.

However, such powerful fan filter units create excessive noise. It is known to use insulation materials to line along a conduit to or within the fan filter units to reduce noise. However, over time, the particles or fiber from the insulation material are dislodged from the surface and contaminate the clean room facility.

The problem associated with fan filter noise is particularly exacerbated in confined spaces or enclosures such as a multi-story water fabrication plant. By confined space, the present invention envisages the height of the ceiling to be less than three meters. Low ceilings cause noise from fan filter unit to be particularly pronounced.

Previously, an apparatus which minimises noise from a fan filter unit has been suggested by the current applicant in WO 99/11984. However, the S-shaped baffles of this earlier design only allow the design to be used with fans which rotate with a predetermined orientation, i.e. either only clockwise or anti-clockwise.

The present invention attempts to address the above problem of reducing noise associated with a fan unit, without increasing contamination caused by the unit. The present invention also attempts to increase the power efficiency of such a fan unit. The invention also can be used regardless of whether the fan rotates in an anti-clockwise or clockwise direction.

The present invention provides a fan unit comprising
a fan blower configured to emit air in a plurality of directions in an air flow plane,
a pair of guides disposed on opposite sides of said fan blower in the said air flow plane to guide the flow of air between the two guides, each guide having and indent opposite said fan to accommodate said fan and each guide being symmetric about a symmetry plane perpendicular to the air flow plane formed through the centre of the fan and an indent, and upper and lower baffles at each end of the guides to direct air out of the unit, the baffles being arranged perpendicular to the direction of the plane of air with the lower baffle beneath the upper baffle the baffles being inclined with respect to one another, such that the distance between the baffles decreases in a direction away from the fan.

The symmetric shape of each guide with respect to the fan allows the guides to be used in the same positions regardless of the direction of orientation of the fan.

In addition to the indent, the guides are preferably provided with protrusions on either side of the indent, wherein the protrusions extend towards the opposite guide. Thus, each guide has a substantially "W"-type shape. Preferably, the guide has a smoothly varying profile at the indent and, more preferably at the protrusions. However, the noise-reduction properties may be partially achieved, using a guide with straight sections.

The configuration of the guides reduces the noise from the fan unit. Also, the configuration of the guides enhances the velocity of air circulating in the unit. Hence, a more efficient fan unit can be produced as a lower power can be used to drive the fan to achieve the same circulating air velocity.

The air in the fan filter unit moves between the two guides. Baffles are preferably located at either end of the guides. The baffles are provided to direct the air away from the fan and out of the fan unit.

There are a pair of baffles at each end of the guides. There is an upper baffle and a lower baffle with the lower baffle beneath the upper baffle. The vertical direction is taken to be the direction which is perpendicular to the plane of air emitted from the fan. The baffles are preferably inclined with respect to one another, such that the distance between the baffles decreases in a direction away from the fan. Preferably, the upper baffles are disposed at an angle of at least 40° and at most 60° to the direction of the plane of air. More preferably, they are arranged at an angle of about 45° to the air flow plane.

The lower baffles are preferably arranged at an angle of at least 5° and at most 15° to the direction of the plane of air more preferably at about 10° to the plane of air.

The baffles are located such that as the air leaves the guides, the air is reflected by the upper baffle onto the lower baffle, the lower baffle is positioned to direct the air out of an outlet.

Preferably, the fan unit comprises a housing which has a base plate and an upper housing located above the base plate, the fan and guides being located between the upper housing and lower base plate, the unit having side sections which may be integral with the upper housing. The side sections being locate at opposite ends of the guides, such that the baffles lie between the side sections and the ends of the guides.

In the above configuration, the base plate will preferably be located relative to the housing such that the separation between the base palate and the upper surface of the upper housing is smaller that the distance which the side sections protrude from the upper surface of the housing. There is also a gap between the side sections and the base plate to form the outlet of the fan unit. The gap between the side section of the housing and the base plate should, ideally be large enough to accommodate at least a part of the lower baffle in this gap.

The fan unit of the present invention is primarily intended for use in a clean room. Therefore, the unit preferably comprises a filter. Generally, this filter will be located below the base plate of the unit.

The guides and/or the baffles of the present invention will preferably be made from a solid material, more preferably a metal. The guides and/or baffles may also be perforated.

The present invention will now be described with reference to the following non-limiting embodiments which:

Figure 1:
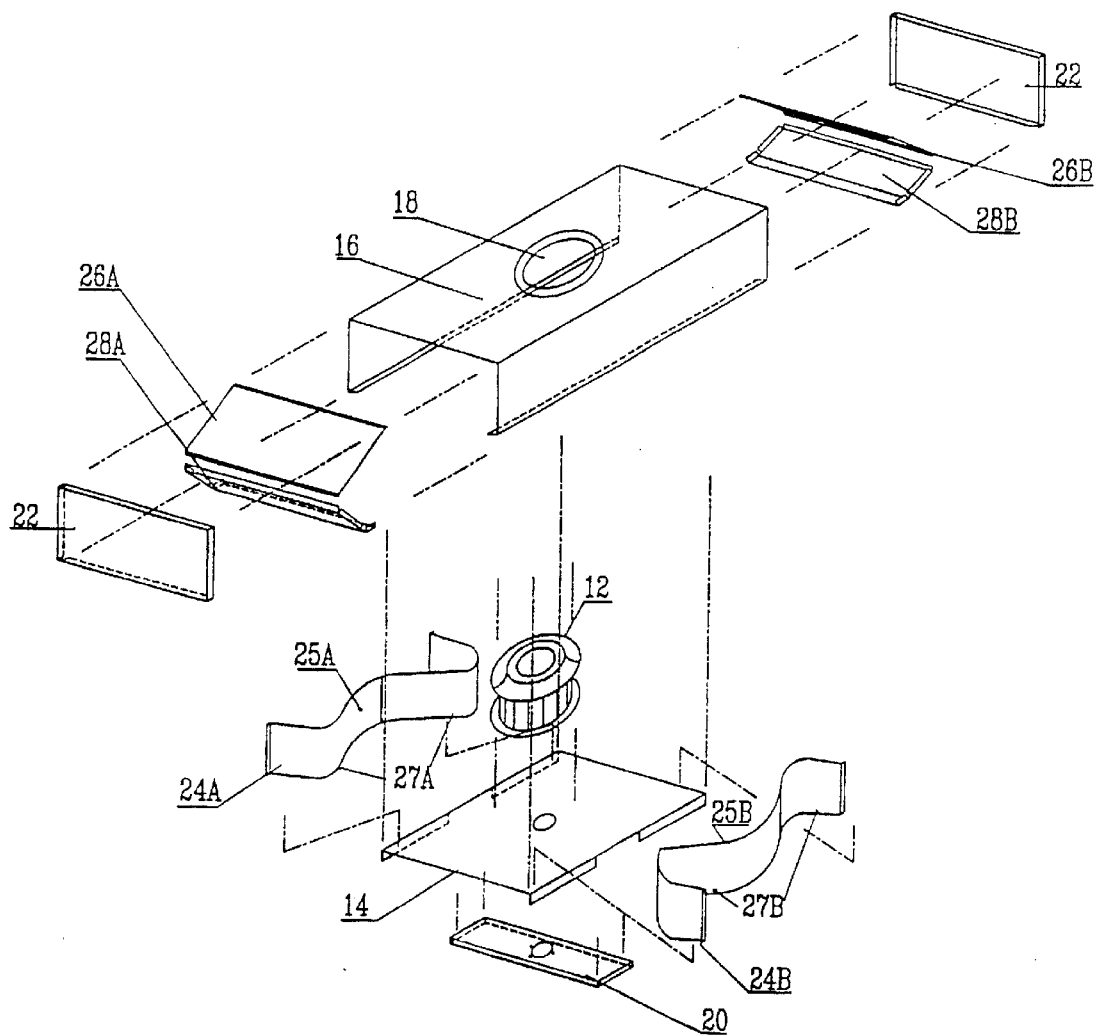
FIG. 1 is a exploded, right side, perspective elevational view of an embodiment of the present invention.

FIG. 1 shows an exploded view of the fan filter unit. For clarity, the filter is not shown. A rotatable fan blower 12 is located on a base plate 14. A mounting plate 20 for the fan blower 12 is located on an opposing side of the base plate 14 to the fan blower 12.

The fan blower 12 is located within a housing which is formed from the base plate 14, an upper housing 16 and end sections 22. The upper housing 16 has an air inlet 18 located in its centre. Such that in use, the air inlet is located above fan blower 12. Fan blower 12 is a conventional type blower. It is configured to be rotated by a motor (not shown) which will be located on opposing side of base plate 14 to the fan blower 12. As the fan blower rotates, it air is drawn through inlet 18 and expelled air in direction tangential to the rotation direction of the fan blower 12.

The fan blower is also provided with guides 24A and 24B which are located on either side of the fan blower 12 and are disposed within the stream of emitted air from fan blower 12. Each guide is provided with an indent 25A and 25B which, when the guide is in position, accommodate the shape of the fan blower 12. On either side of the indent are protrusions 27A and 27B. Each of the protrusions extends towards the opposite guide 24.

Upper baffles 26A and 28B and lower baffles are provided at either end of the unit, such that the baffles are disposed between fan blower 12/guides 24A and 24B and the end section 22.

The guides 24A, 24B are inclined with respect to one another such that the distance between the guides 24A, 24B decreases away from the fan blower. Essentially, the guides from a substantially V-shaped structure where the apex of the V is pointing towards the end sections 22.

Figure 2:
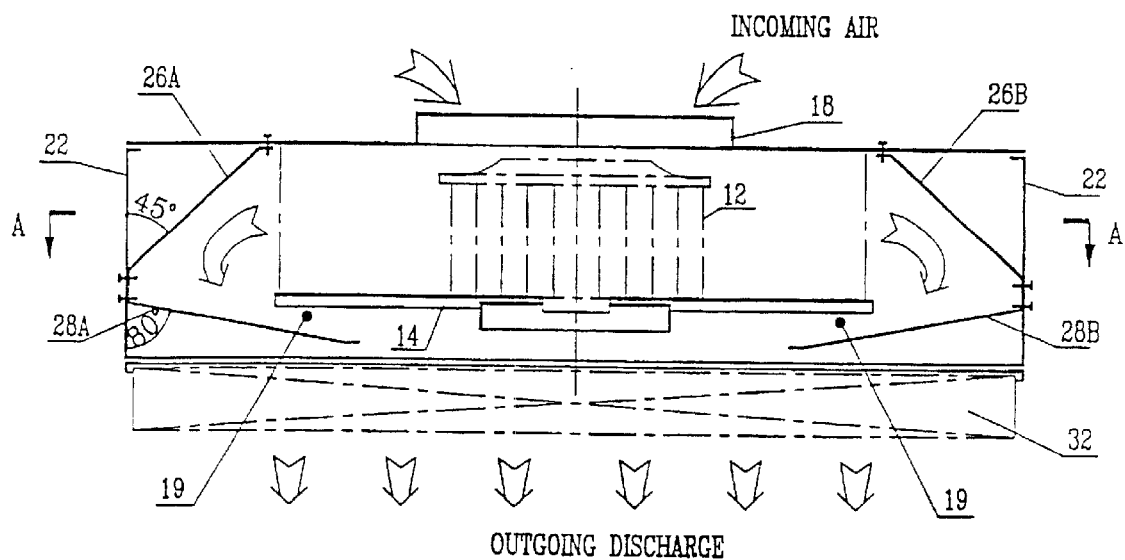
FIG. 2 is a front, cross sectional elevational view of the embodiment of FIG. 1.

FIG. 2 shows the direction of air flow within the fan filter of FIG. 1. As previously described, air is drawn in through inlet 18 by the rotation of fan blower 12. Fan blower 12 is located on base plate 14. The rotation of the fan blower forces air away from the fan blower and into the baffles 26A and 26B and 28A and 28B. The direction of the baffles turns the air from traveling away from the blower which is located on the base plate to traveling out of the outlet 19 which is located beneath the base plate 14. The air then travels through filter 32 which is located underneath opening 19.

Figure 3:
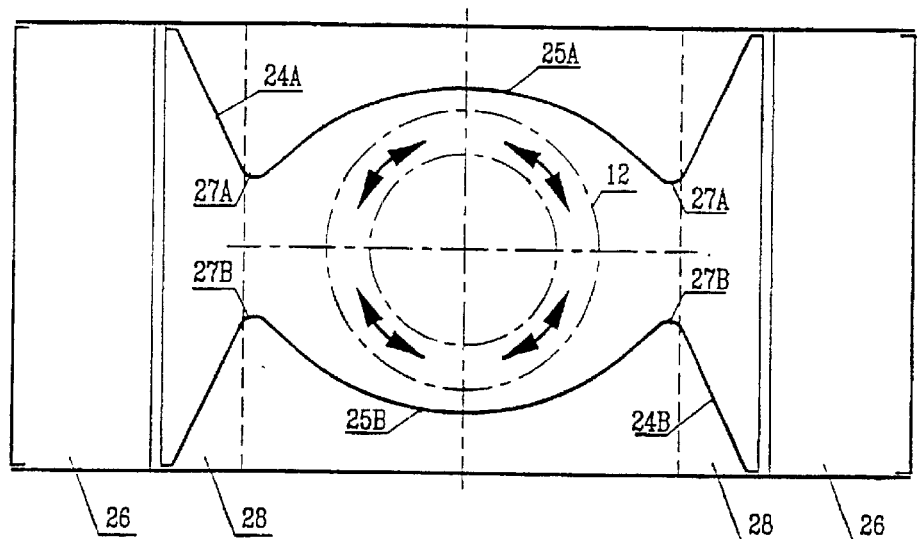
FIG. 3 is a top, plan elevational view of section A—A in FIG. 2.

FIG. 3 shows a plan view of the constructed fan filter unit of FIGS. 1 and 2. It can be clearly seen that the fan blower 12 is located between guides 24A and 24B and is accommodated within indents 25A and 25B of the guides 24A and 24B. The shape of the protrusions 27A and 27B which extend towards the complementary protrusions in the opposite guide should also be noted.

The guides 24A, 24B are contoured to receive the discharged air from the fan blower 12 (shown in dotted circle) and guide the flow of air with minimum amount of turbulence towards the baffles 26 and 28. As this is a top View, the lower baffle 28 is not clearly shown.

The upper baffles 26 are disposed at angles of about 45° to the plane of air which is emitted from blower 12, to diffuse air from the guides 24. The lower baffles 28 are disposed at an angle of about 10° to the airflow plane to redirect the flow of air below the base plate 14.

The plan view of FIG. 3 is symmetric about both an axis which traverses the centre of the indents and the centre of the fan and an axis which runs through the centre of the fan and the centre of baffles 26 and 28. This symmetric arrangement allows a fan to be accommodated which can rotate in either direction.

Figures 4, 5:
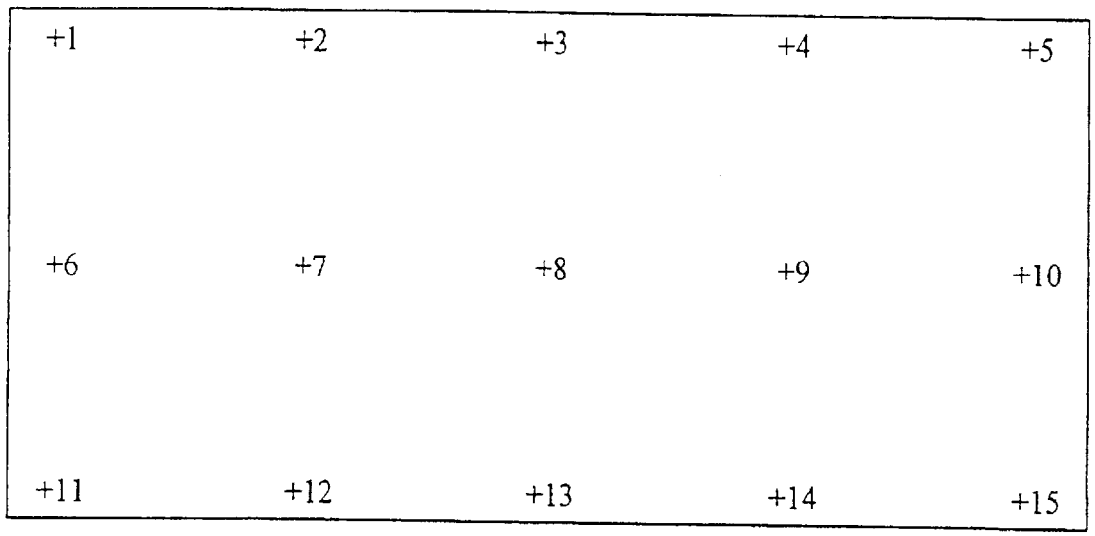
FIG. 4 show the locations in the fan filter unit where the airflow velocities were measured for FIG. 5.
FIG. 5 is a chart comparing the average velocity of airflow and noise level of a fan filter unit with and without the present invention over a range external static pressures (measured in mmAq) for different airflow condition.

FIGS. 4 and 5 shows results from the fan unit. FIG. 5 shows a plot of the average air velocity taken at 15 different points in the fan unit. The 15 locations within the fan unit are shown in FIG. 4.

It can be seen that far superior results are provided when the air guide and baffle are present. Thus, the present invention allows a higher air velocity which provides enhanced air circling action with the same amount of driving power to the fan. Hence, the present invention provides considerable energy advantages to that of the prior art.

FIG. 5 also shows the noise level measured 1 meter away from the fan in decibels for a fan filter unit with the air guide and baffle and without the air guide and baffle. It can be seen that the noise is greatly reduced for the case where the air guide and baffle are present.

What is claimed is:

1. A fan unit comprising:
   a fan blower configured to emit air in a plurality of directions in an air flow plane;
   a pair of guides disposed on opposite sides of said fan blower in said air flow plane to guide the flow of air between the two guides, each guide having an indent opposite said fan to accommodate said fan;
   each guide being symmetric about a symmetry plane perpendicular to the air flow plane formed through the centre of the fan and at least one of the indents; and
   upper baffles at each end of the guides to direct air out of the unit, the upper baffles being arranged perpendicular to the direction of the plane of air, the upper baffles are converging.

2. A fan unit as claimed in claim 1, wherein there are provided lower baffles at each end of the guides, the lower baffles being inclined such that the distance between the upper and lower baffles decreases in a direction away from the fan.

3. A fan unit according to claim 1, wherein each guide is formed such that there is a protrusion on either side of the indent on each guide, each protrusion extending towards the opposite guide so that each guide has a shape substantially similar to a "W".

4. A fan unit according to claim 3, wherein the guides have a smoothly varying profile at the protrusions.

5. A fan unit according to claim 1, wherein the guides have a smoothly varying profile at the indents.

6. A fan unit according to claim 1, wherein the guides are arranged symmetrically with respect to one another on either side of the fan.

7. A fan unit according to claim 1, wherein the guides comprise a solid material.

8. The fan unit according to claim 1, wherein the baffles comprise a perforated material.

9. A fan unit according to claim 1, wherein said upper baffles are disposed at an angle of from 40 degrees to 60 degrees to the plane of air flow.

10. A fan unit according to claim 9, wherein said upper baffles are disposed at an angle of 45 degrees to the plane of air flow.

11. A fan unit according to claim 2, wherein the lower baffles are disposed at an angle of from 5 degrees to 15 degrees to the plane of air flow.

12. A fan unit according to claim 11, wherein the lower baffles are disposed at an angle of 10 degrees to the plane of air flow.

13. A fan unit according to claim 1, wherein the fan and guides are disposed on a base plate.

14. A fan unit according to claim 13, wherein the unit further comprises a top housing coupled to said base plate with an inlet for drawing air into the fan, and side sections for enclosing the fan, an air outlet being formed by a gap between the base plate and the side sections.

15. A fan unit according to claim 14, wherein the lower baffles are at least partially located in the gap between the side sections and the base plate.

16. A fan unit according to claim 1, comprising a filter.

17. A fan unit as claimed in claim 1, wherein the pair of guides enable the blower to rotate either clockwise or anticlockwise.

18. A fan unit comprising:
- a blower means to emit air in a plurality of directions in an air flow plane;
- at least two guide means on opposite sides of the blower means in the air flow plane to guide the air flow between the guide means with a minimum amount of turbulence;
- each of the guide means being shaped provide an accommodation region to accommodate the blower means;
- each guide means being symmetrical to enable the fan unit to use a blower unit that rotates in either direction; and
- converging baffle means at an outer end of the guide means to receive and diffuse the air from the guide means and direct air out of the fan unit, the baffle means being perpendicular to the air flow plane.

19. A fan unit as claimed in claim 18, wherein the inclined baffle means includes an upper baffle at an upper angle of inclination.

20. A fan unit as claimed in claim 19, wherein the inclined baffle means includes a lower baffle at a lower angle of inclination, the upper angle and the lower angle being different.

21. A fan unit as claimed in claim 18, wherein the inclined baffle means includes a lower baffle at a lower angle of inclination.

22. A fan unit as claimed in claim 18, wherein each of the guide means has a protrusion on either side of the accommodation region, the protrusion extending towards the guide means opposite so that each guide means has a shape substantially similar to a "W".

23. A fan unit comprising a fan blower configured to emit air in a plurality of directions in an air flow plane; a pair of guides disposed on opposite sides of said fan blower in the said air flow plane to guide the flow of air between the two guides, each guide having an indent opposite said fan to accommodate said fan; each guide being symmetric about a symmetry plane perpendicular to the air flow plane formed through the centre of the fan and at least one of the indents; upper baffles at each end of the guides to direct air out of the unit, the upper baffles being arranged perpendicular to the direction of the plane of air, the upper baffles being inclined; lower baffles at each end of the guides, the lower baffles being inclined such that the distance between the upper and lower baffles decreases in a direction away from the fan; each guide being formed such that there is a protrusion on either side of the indent on each guide, each protrusion extending towards the opposite guide so that each guide has a shape substantially similar to a "W"; the guides have a smoothly varying profile at the protrusions and a smoothly varying profile at the indents; the guides being arranged symmetrically with respect to one another on either side of the fan.

* * * * *